(12) United States Patent
Kalogeropulos et al.

(10) Patent No.: US 9,465,618 B2
(45) Date of Patent: Oct. 11, 2016

(54) METHODS AND SYSTEMS FOR OPTIMALLY SELECTING AN ASSIST UNIT

(71) Applicant: ORACLE INTERNATIONAL CORPORATION, Redwood City, CA (US)

(72) Inventors: Spiros Kalogeropulos, Redwood City, CA (US); Partha Tirumalai, Redwood City, CA (US)

(73) Assignee: Oracle International Corporation, Redwood City, CA (US)

( * ) Notice: Subject to any disclaimer, the term of this patent is extended or adjusted under 35 U.S.C. 154(b) by 192 days.

(21) Appl. No.: 14/150,471

(22) Filed: Jan. 8, 2014

(65) Prior Publication Data

US 2015/0193238 A1 Jul. 9, 2015

(51) Int. Cl.
*G06F 9/44* (2006.01)
*G06F 9/38* (2006.01)
*G06F 9/48* (2006.01)

(52) U.S. Cl.
CPC .............. *G06F 9/3877* (2013.01); *G06F 9/48* (2013.01); *G06F 8/10* (2013.01); *G06F 8/20* (2013.01); *G06F 8/24* (2013.01); *G06F 8/71* (2013.01)

(58) Field of Classification Search
CPC .............. G06F 8/10; G06F 8/20; G06F 8/24; G06F 8/71; G06F 11/3419
See application file for complete search history.

(56) References Cited

U.S. PATENT DOCUMENTS

| | | | |
|---|---|---|---|
| 6,829,697 B1 | 12/2004 | Davis et al. | |
| 7,551,617 B2* | 6/2009 | Eatherton | H04L 12/5693 370/392 |
| 8,005,978 B1 | 8/2011 | Duffie, III et al. | |
| 9,361,116 B2* | 6/2016 | Ben-Kiki | G06F 9/3881 |
| 2003/0225816 A1 | 12/2003 | Morrow et al. | |
| 2006/0031818 A1* | 2/2006 | Poff et al. | 717/114 |
| 2008/0104610 A1* | 5/2008 | Norton | G06F 11/3419 718/108 |
| 2008/0209245 A1* | 8/2008 | Becker | G06F 11/3024 713/322 |
| 2008/0271043 A1* | 10/2008 | Kim | G06F 11/3423 718/108 |
| 2009/0217286 A1 | 8/2009 | Schmidbauer et al. | |
| 2009/0282214 A1* | 11/2009 | Kuesel | G06F 9/30036 712/29 |
| 2011/0131430 A1* | 6/2011 | Krishnamurthy et al. | 713/320 |

(Continued)

OTHER PUBLICATIONS

Brisebarre et al. "An Efficient Method for Evaluating Polynomial and Rational Function Approximations", Jul. 2-4, 2008 IEEE, pp. 233-238; <http://ieeexplore.ieee.org/stamp/stamp.jsp?tp=&arnumber=4580185&tag=1>.*

(Continued)

*Primary Examiner* — Thuy Dao
*Assistant Examiner* — Ben C Wang
(74) *Attorney, Agent, or Firm* — Marsh Fischmann & Breyfogle LLP; Jonathon A. Szumny; Christopher B. Wherly

(57) ABSTRACT

Methods, apparatuses, and systems that allow a microprocessor to optimally select an assist unit (co-processor) to reduce completion times for completing processing requests to execute functions. The methods, apparatuses, and systems include assist unit hardware, assist unit management software, or a combination of the two to optimally select the assist unit for completing a specific processing request. In optimally selecting an assist unit, the methods, apparatuses, and systems calculate estimated times for completing the processing request with conventional means and with assist units. The times are then compared to determine the fastest time for completing a specific processing request.

18 Claims, 7 Drawing Sheets

(56) References Cited

U.S. PATENT DOCUMENTS

| | | | |
|---|---|---|---|
| 2012/0154412 A1* | 6/2012 | Harney | G06T 1/20 345/522 |
| 2013/0031553 A1* | 1/2013 | Hou et al. | 718/100 |
| 2013/0111453 A1* | 5/2013 | Kalogeropulos | G06F 8/4452 717/161 |
| 2014/0189317 A1* | 7/2014 | Ben-Kiki | G06F 9/30079 712/220 |
| 2014/0189332 A1* | 7/2014 | Ben-Kiki | G06F 9/30145 712/244 |
| 2014/0189333 A1* | 7/2014 | Ben-Kiki | G06F 9/3861 712/244 |
| 2015/0007196 A1* | 1/2015 | Toll | G06F 9/5083 718/105 |
| 2015/0106816 A1* | 4/2015 | Dusanapudi et al. | 718/102 |
| 2015/0331673 A1* | 11/2015 | Mihalcea | G06F 8/00 717/100 |

OTHER PUBLICATIONS

Krishna et al., "Hardware Acceleration in the IBM PowerEN Processor—Architecture and Performance", ACM, Sep. 2012, pp. 389-399; <http://dl.acm.org/citation.cfm?id=2370872&CFID=630209785&CFTOKEN=65455725>.*

Sean Roberts, "Co-tuning of SW Specializers and HW Accelerators within a CNN Application", University of California at Berkeley, May 2016, pp. 1-10; <http://www.eecs.berkeley.edu/Pubs/TechRpts/2016/EECS-2016-53.pdf>.*

Balakrishnan et al., "Energy-efficient Mapping and Scheduling of Task Interaction Graphs for Code Offloading in Mobile Cloud Computing", IEEE, Dec. 2013, pp. 34-41; <http://ieeexplore.ieee.org/stamp/stamp.jsp?tp=&arnumber=6809337>.*

Intel Xeon Phi Coprocessor—Offload Compilation, IBM, Sep. 2012.

Bernard Goossens, A Multithreaded Vector Co-processor, Parallel Computing Technologies, 4th International Conference, PaCT-97 Yaroslavl, Russia, Sep. 8-12, 1997 Proceedings, Lecture Notes in Computer Science vol. 1277, 1997, pp. 311-321.

M. M. Rafique,Symphony: A Scheduler for Client-Server Applications on Coprocessor—Based Heterogeneous Clusters, Cluster Computing (CLUSTER), 2011 IEEE International Conference, Sep. 26-30, 2011, pp. 353-362, Austin, TX.

* cited by examiner

METHODS AND SYSTEMS FOR OPTIMALLY SELECTING AN ASSIST UNIT

BACKGROUND

1. Field of the Invention

The present invention generally relates to microprocessors and, more particularly, to methods and systems that help accelerate a microprocessor's execution of functions by optimally selecting an available assist unit.

2. Relevant Background

Integrated circuits such as microprocessors contain multiple processing cores having multiple hardware threads that receive processing requests (also referred to as software tasks) to execute various functions for a computer. As microprocessor technology advances, more and more components and features are incorporated into the design of microprocessors to execute functions at faster rates. A recent design trend for microprocessors is to incorporate specialized co-processors, also referred to as accelerators or assist units, which execute functions in targeted applications at faster rates. The use of such assist units is typically encapsulated into a collection of functions (also referred to as a library of functions) within the microprocessor. The library of functions may be executed on older systems with conventional software and on newer systems with specialized software that leverages the available assists units.

In modern designs, a microprocessor may include one or more assist units assigned to one or more processing cores having multiple hardware threads. For example, a processing core may have an assigned assist unit capable of executing a specific function—such as a memory copy function. While the processing core is capable of executing the memory copy function using one or more of the processing core's hardware threads, the assist unit is able to execute the memory copy function at a faster rate. Thus, in an effort to accelerate execution of the memory copy function, when the processing core receives a processing request for the memory copy function—the processing core will request that the assigned assist unit execute the copy function. Not only does this allow the assist unit to accelerate completion of the processing request (execution of the function), but it also allows the processing core to execute another memory copy function or perform other tasks with the hardware thread that would otherwise be executing the original memory copy function. If additional processing requests are made to the assigned assist unit, then the assist unit will queue the additional processing requests and complete the requests in turn. Accordingly, assist units may help balance the microprocessor's workload and accelerate execution of functions.

SUMMARY

Typical microprocessors only check for the presence or absence of assist units but fail to adequately address whether an assist unit should be used in the first place. While assist units may accelerate execution of functions, assist units may also delay execution of functions by increasing completion times for processing requests. Accordingly, a microprocessor may not always benefit from using an assist unit.

For example, assume that a microprocessor (also referred to as a microprocessor chip or integrated circuit) includes far fewer assist units than hardware threads of execution (i.e., conventional processing means) for a particular group of processing cores to which the assist units are assigned. When a processing request for a specific function is received by a processing core, it assigns the processing request to a hardware thread for processing. While processing the request, the processing core (or hardware thread) checks to see if an assist unit is present to complete the processing request (i.e., accelerate execution of the function associated with the processing request). If an assist unit is not present, the hardware thread completes the processing request by executing code that performs the function conventionally. If an assist unit is present, the hardware thread will request that the assist unit complete the processing request and thereby execute the function (i.e., execute code that causes the assist unit to perform the function) regardless of the time it will take the assist unit to actually complete the request.

More, specifically, if the assist unit is currently busy completing requests from other hardware threads, then the assist unit queues the outstanding (i.e., current) request until the assist unit completes antecedent requests. However, if another way to process the outstanding request—such as the original hardware thread that initiated the request or another available hardware thread or a different assist unit—were available to complete the processing request, then the assist unit may have been delaying completion time by queuing the outstanding processing request. That is, the assist unit may have delayed completion time by placing the processing request in the queue when the processing request could have otherwise been completed faster by using an available hardware thread or with another available assist unit (while the originally assigned assist unit was completing antecedent requests).

In this regard, disclosed herein are methods, apparatuses, and systems that allow microprocessors to optimally select an assist unit based on various features related to processing request completion times in order to reduce the time it takes to execute a function (i.e., complete a processing request). As will be discussed in more detail herein, the present disclosure makes use of assist unit hardware, assist unit management software, or a combination of the two to manage various features and determine completion times in order to optimally select an assist unit.

The various features may include a queue of processing requests that are pending at the assist unit, a function type and size (number of processing steps) for each processing request, a time unit per step ("TUPS") value for each function type related to the assist unit, a conventional TUPS value for each function type related to hardware threads using conventional software, and an assist unit counter that tracks time units related to the assist unit.

The methods and systems may use these various features to calculate estimated times (i) to complete the processing request with conventional hardware threads, (ii) to complete the same processing request with an assigned assist unit, and/or (ii) to complete the same processing request with another available assist unit. Once calculated, the estimated completion times for the assigned assist unit may be compared to the estimated completion time for the conventional hardware threads, and/or the estimated completion time for another available assist unit—in order to determine the fastest completion time. If the assist unit has a large queue of requests and a conventional hardware thread could complete the outstanding processing request faster, then the outstanding processing request may be sent to the hardware thread for execution. In a similar fashion, the assist unit may send the outstanding processing request to another available assist unit. The processing request may be queued by the assigned assist unit if the assist unit can complete the requested processing request faster than other available options.

In one aspect, a system for optimally selecting an assist unit to reduce completion times for completing processing requests to execute functions includes a microprocessor having a plurality of processing cores. Each processing core may include multiple hardware threads for executing functions (i.e., executing code that performs the function conventionally), such as a copy function, an uppercase letter function, or a comparison function. The system may further include at least one assist unit interconnected with the plurality of processing cores. The system may include management software in communication with the plurality of processing cores and the at least one assist unit. The management software may be compatible with existing software used by the plurality of processing cores. The management software may manage processing requests and locate an available assist unit to complete each processing request. The management software may also calculate an assist unit completion time for an outstanding processing request, calculate a conventional completion time for the outstanding processing request, and then compare the conventional completion time to the assist unit completion time for the outstanding processing request. The management software may then assign the outstanding processing request to the assist unit when the assist unit completion time is less than the conventional completion time. Alternatively, the management software may assign the outstanding processing request to an available processing core when the assist unit completion time is greater than the conventional completion time.

In one embodiment, determining the assist unit completion time for the at least one outstanding processing request may include calculating a total assist unit completion time. The total assist unit completion time may include (1) a remaining assist unit completion time for completing an active request by the available assist unit, and (2) a pending assist unit completion time for completing pending processing requests by the available assist unit.

In another aspect, a method for optimally selecting an assist unit to reduce completion times for completing processing requests to execute functions includes receiving, with a microprocessor, at least one processing request to execute a function with an assist unit. The method includes determining an assist unit completion time for completing the processing request with the assist unit in response to the processing request. The method further includes determining a conventional completion time for completing the processing request with a conventional hardware thread associated with the microprocessor. When the assist unit completion time is less than the conventional completion time then the assist unit will complete the processing request. When the conventional completion time is less than the assist unit completion time then the method may route the processing request to the hardware thread and complete the processing request using a conventional process that may include conventional software.

In one embodiment, the step of determining the assist unit completion time includes analyzing the utilization of the assist unit with assist unit hardware. The analysis of utilization may include determining a queued assist unit processing time for completing pending requests in a queue of requests with the assist unit, determining a current assist unit completion time for completing the current request with the assist unit, and summing the queued assist unit processing time and the current assist unit completion time. The analysis may further include determining a remaining processing time for an active request being processed with the assist unit. In some embodiments, the method may maintain a counter that tracks time units for completing one or more pending requests in the queue of requests with the assist unit. The method may also include recognizing a function type and function size for the processing request and associating time units to the processing request based on the function type and the function size.

In a further aspect, a method for optimally selecting an assist unit to reduce completion times for completing processing requests to execute functions includes receiving a processing request on a microprocessor having multiple processing cores and at least one assist unit. The method includes determining a function type and function size for the processing request. The method then finds an available assist unit based on the function type and function size and assigns a processing request to the available assist unit. The method may then calculate an assist unit completion time to complete the processing request with the available assist unit. In one embodiment, the method may include finding an available processing core and calculating a conventional completion time to complete the processing request with the available processing core. Then, the method may designate the available assist unit to complete the processing request when the assist unit completion time is less than the conventional completion time. Alternatively, the method may designate the available processing core to complete the processing request when the assist unit completion time is greater than the conventional completion time.

In addition to the exemplary aspects and embodiments described above, further aspects and embodiments will become apparent by reference to the drawings and by study of the following descriptions.

BRIEF DESCRIPTION OF THE DRAWINGS

The disclosure herein may be more completely understood in consideration of the following detailed description of various embodiments in connection with the accompanying drawings, in which.

Figure 1:
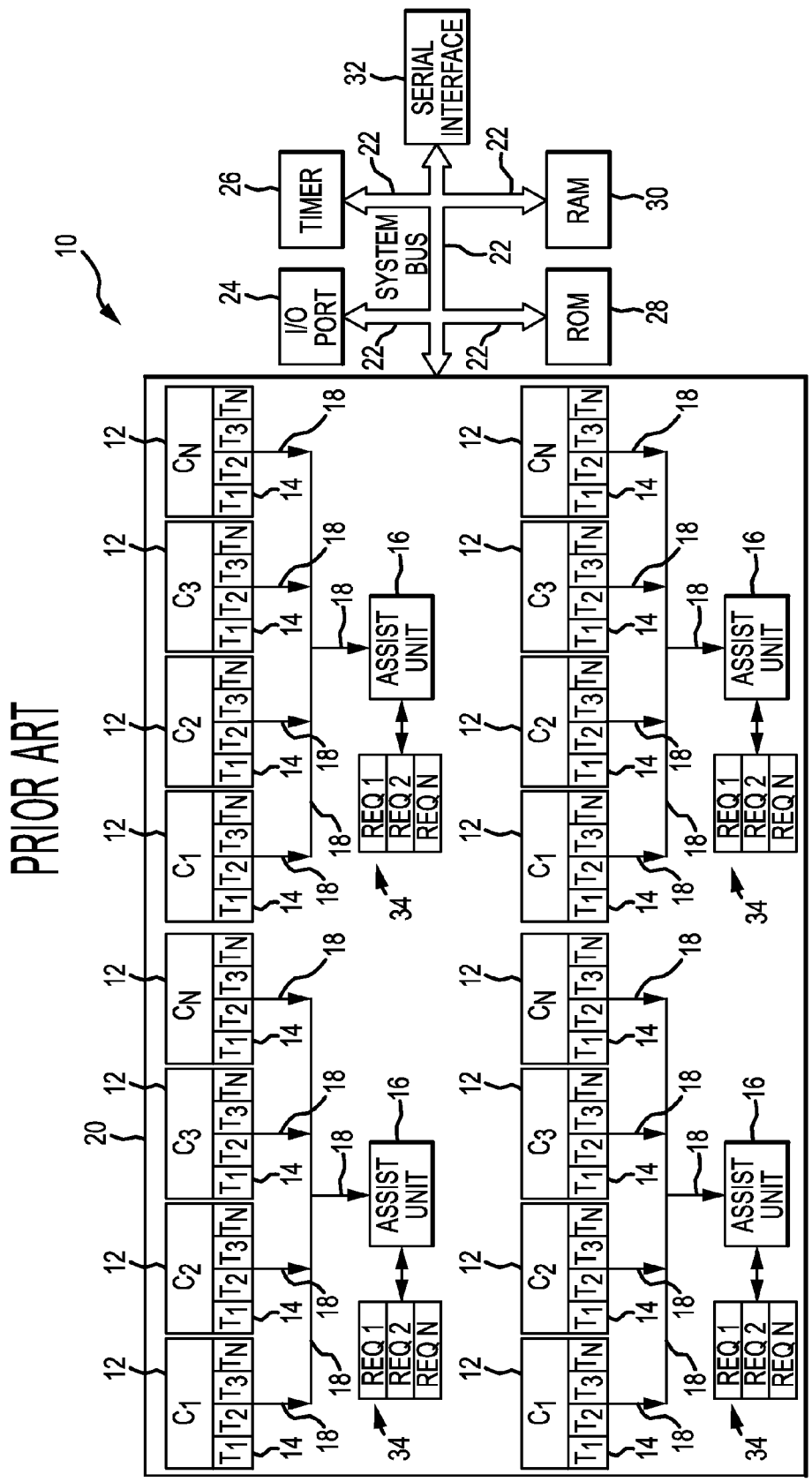
FIG. 1 is a block diagram of a prior art microprocessor configuration having multiple processing cores, hardware threads, and assist units to execute various functions on a computer.

While the invention is susceptible to various modifications and alternative forms, specifics have been shown by way of example in the drawings and will be described in detail below. It should be understood that the intention of the detailed description is not to limit aspects of the invention to the particular embodiments described. On the contrary, the invention covers all modifications, equivalents, and alternatives falling within the spirit and scope of the invention.

DETAILED DESCRIPTION

The following defined terms disclosed in this detailed description shall apply, unless a different definition is given in the claims or elsewhere in this specification. As used in this detailed description and the appended claims, the singular forms "a," "an," and "the" include the plural referents unless the content clearly dictates otherwise. In addition, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into additional embodiments unless clearly stated to the contrary. While the embodiments may be described in terms of spatial orientation, the terminology used is not intended to be limiting, but instead to provide a straightforward description of the various embodiments.

The present disclosure is generally directed to methods, apparatuses, and systems that allow a microprocessor to optimally select a co-processor, referred to herein as an assist unit, to reduce completion times for completing processing requests to execute functions. The present disclosure may include assist unit hardware, assist unit management software, or a combination of the two to optimally select the assist unit for completing a specific processing request. The methods, apparatuses, and systems calculate times for completing the processing request for conventional means and for assist units. The times are then compared to determine the fastest time for completing a specific processing request.

Referring now to FIG. 1 illustrating a block diagram of a prior art microprocessor 10 configuration having multiple processing cores 12, multiple hardware threads 14, and multiple assist units 16 to complete processing requests 18 and execute various functions on a computer. As shown, each assist unit 16 may be assigned to a group of processing cores 12 located on a central processing unit ("CPU") 20 (e.g., chip). The CPU 20 may receive processing requests 18 by way of a system bus 22 operatively associated with an I/O port 24, a timer 26, a Read-Only Memory ("ROM") 28, a Random-Access Memory ("RAM") 30, and serial interface 32. In the prior art microprocessor 10, a processing request 18 for execution of a specific function (e.g., a memory copy function) is received by the CPU 20 through system bus 22. The CPU 20 assigns the processing request 18 to a processing core 12 which then assigns the processing request 18 to a hardware thread 14 to complete the processing request 18 and thereby execute the function (e.g., the memory copy function) associated with the processing request 18. While the hardware thread 14 is capable of completing the processing request 18, the hardware thread 14 may determine if an assist unit 16 is present and applicable to complete the processing request 18 (i.e., accelerate execution of the function associated with the processing request 18). If an assist unit 16 is present and applicable, then the hardware thread 18 will send the processing request 18 to the assist unit 16. If the assist unit 16 is busy completing other processing requests 18, then the assist unit 16 will place the current (i.e., outstanding) processing request 18 in a queue 34. The assist unit 16 will then complete the antecedent queued processing requests 18 before completing the newly queued processing request 18. If no assist unit 16 is applicable or present, then the hardware thread 18 will complete the processing request 18 by executing code that completes the associated function conventionally.

In the prior art microprocessor 10 configuration shown in FIG. 1, the hardware thread 14 (processing core 12) processing the processing request 18 only checks for the presence or absence of an assist unit 16—then, if an assist unit 16 is present, the hardware thread 14 sends the processing request 18 to the assist unit 16. However, the microprocessor 10 configuration fails to adequately address whether the assist unit 16 should be used to complete the processing request 18 in the first place. More particularly, while the assist unit 16 may accelerate execution of the function and completion of the processing request 18, the assist unit 16 may also delay the completion time of the processing request 18 by delaying completion of the processing requests 18. For example, if another processing means (such as the original hardware thread 14 that initiated the processing request 18 or another available hardware thread 14 or a different assist unit 16) were available to complete the processing request 18 faster—the assist unit 16 in FIG. 1 may have been delaying completion time by queuing the current (outstanding) processing request 18 in queue 34.

In order to adequately address whether an assist unit should be used to complete a processing request, disclosed herein are methods, apparatuses, and systems that allow a microprocessor to optimally select an assist unit based on various features related to completion times in order to reduce the time it takes to execute a function (i.e., complete the processing request). As will be discussed in more detail herein, the present disclosure makes use of assist unit hardware, assist unit management software, or a combination of the two to manage various features and determine completion times in order to optimally select an assist unit.

Figure 2A:
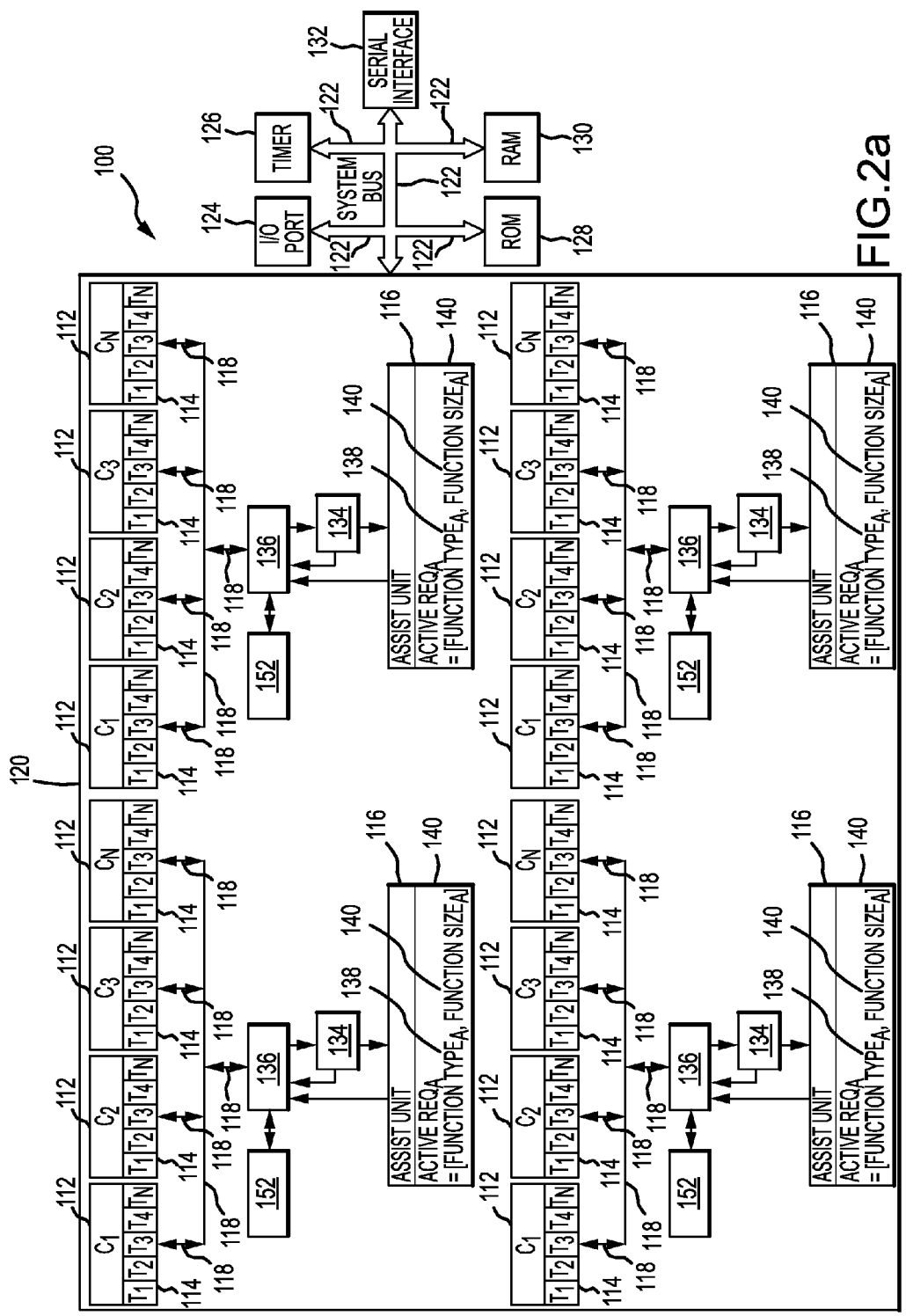
FIG. 2a is a block diagram illustrating various assist units and processing cores in combination with management software.
Figure 2B:
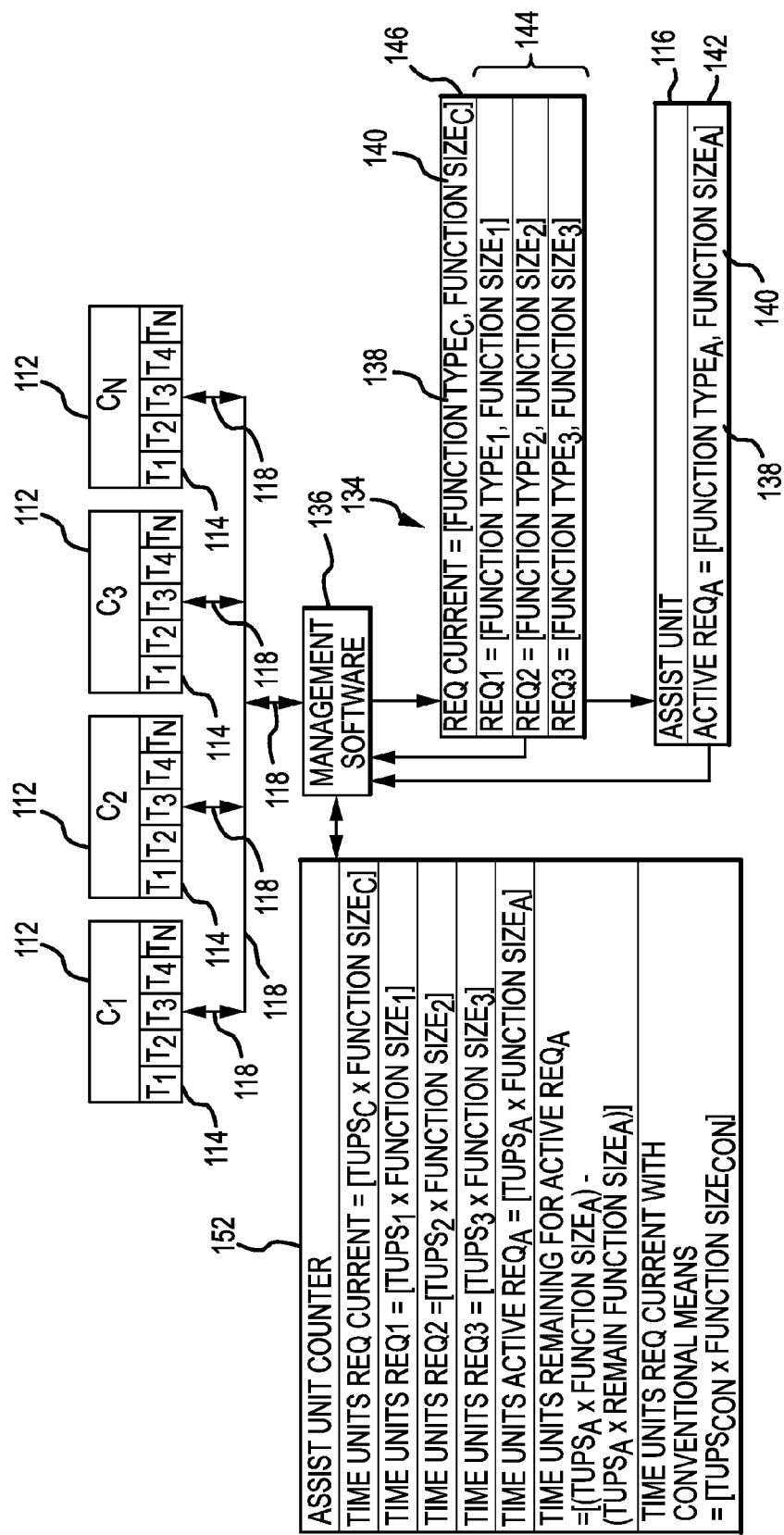
FIG. 2b is a block diagram illustrating an assist unit and processing cores in combination with management software.

Turning now to FIGS. 2a and 2b, illustrating a microprocessor 100 having assist units 116 and processing cores 112 in combination with management software 136. In such an embodiment, a processing request 118 may be received by the CPU 120 through system bus 122. The CPU 120 may then assign the processing request 118 to a processing core 112 which then assigns the processing request 118 to a hardware thread 114. Management software 136 may interact with the hardware thread 114 (e.g., receive the processing request 118) to determine and analyze various features in order to optimally select an assist unit 116.

The various features may include the function type 138 and size 140 of the processing request 118. In some embodiments, the function size 140 is known. In other embodiments, the function size 140 may be unknown. When the function size 140 is unknown, management software 136 may determine such by estimating the function size 140 based on similar function types 138 or from a database of function sizes 140 associated with function types 138. Once the function type 138 and function size 140 are established, the management software 136 may determine if an assist unit 116 is present and capable of completing the processing request 118 based on the function type 138 and function size 140.

More specifically, if an assist unit 116 is present and capable of completing the processing request 118, the management software 136 then begins to analyze whether the assist unit 116 can complete the processing request 118 faster than the hardware thread 114, or, in some embodiments, faster than another available assist unit 116. When the assist unit 116 completion time is less than the hardware thread 114 completion time (i.e., the conventional completion time), then the management system 136 may execute code to complete the processing request 118 with assist unit 116. When the conventional completion time is less than the assist unit 116 completion time, then the management software 136 may execute code to complete the processing request 118 conventionally (i.e., with hardware thread 114 using conventional software).

As mentioned herein, in order to determine whether the assist unit 116 completion time is faster than the conventional completion time, the management software 136 analyzes various features and determines the utilization of the assist unit 116. Broadly, the assist unit 116 completion time may include the sum of completion times for one or more active requests 142 (i.e., requests currently being processed by the assist unit 116), one or more queued pending processing requests 144, and the current processing request 146. As shown in FIG. 2b, the analyzed features may include a queue 134 of pending processing requests 144 having a function type 138 and function size 140 that are pending for completion by the assist unit 116. The function size 140 may be expressed by the number of processing steps. The features also include time units per step ("TUPS") values, such as an assist unit TUPS value for each processing requests 118 including current processing request 146 and active processing request 142. The TUPS values may also include a conventional TUPS value related to the completion time for the hardware thread 114 to complete the current processing request 146 using conventional software. Additional features may include an assist unit counter 152 for determining time units with the TUPS values. The assist unit counter 152 may determine and track the time units for the pending processing requests 144 in queue 134, the active request 142 being actively processed by the assist unit 116, the time units remaining for the active request 142 being actively processed by the assist unit 116, and the time units to complete the current processing request 146 with the assist unit 116 (in isolation), as well as the time units to complete the current processing request 110 with a conventional means.

The management software 136 may initially analyze the various features to determine the utilization of assist unit 116 by determining a completion time for pending processing requests 144 in queue 134 with the assist unit 116. The function type 138 and function size 140 must be established to determine the completion time for the pending processing requests 144. For example, the pending processing requests 144 in queue 134 may include the following three pending processing requests 144:

REQ 1=[Greater_than_function, 17863]
REQ 2=[Memory_copy_function, 45892]
REQ 3=[Upper_case_character_function, 13589]

The three pending processing requests 144 each include a function type 138 (i.e., Greater_than_function, Memory_copy_function, and Upper_case_character_function) and a function size 140 (i.e., 17863, 45892, and 13589) associated with each function type 138. The function sizes 140 may represent the number of steps (also referred to as elements) associated with each function type 138. Knowing the function type 138 and function size 140, the management system 136 may then use a linear model to determine the time units for each processing request 118. In some embodiments, the management system 136 may also use a polynomial model to determine the time units for each processing request 118. In determining the time units for each processing request 118, the management system 136 may maintain a table of rates (i.e., TUPS values) or polynomial coefficients for each function type 138. For example, the table of TUPS values for the above example processing request may include a TUPS value of 6 for the Greater_than_function, a TUPS value of 3 for the Memory_copy_function, and a TUPS value of 8 for the Upper_case_character_function.

Using the TUPS values, assist unit counter 152 then determines and tracks the time units to complete the pending processing requests 144. For example, the time units to complete the pending processing requests 144 in queue 134 for the above example may be as follow:

Time Units REQ 1=17863×(TUPS value 6)
Time Units REQ 2=45892×(TUPS value 3)
Time Units REQ 3=13589×(TUPS value 8)

Accordingly, in the above example the Time Units REQ 1=107178, Time Units REQ 2=137676, and Time Units REQ 3=108712. The management software 136 may then calculate the total time units for pending processing requests 144 (REQ 1, REQ 2, and REQ3) by summing the times units. For this example, the total time units for the pending processing requests equals 353566 time units.

To calculate the remaining time for the active request 142, the total function size 140 minus the completed steps (by the assist unit 116) may be calculated and multiplied by the TUPS value for the active request 142. For example, assume the active request 142 is a Less_than_function and has a size of 38617 steps with a TUPS value of 6. In addition, assume that 35617 steps of the total 38617 steps have already been completed by the assist unit 116. The calculation then becomes (TUPS value 6)×(38617−35617) which equals 18000 remaining time units for the active request 142. As active request steps are completed, the remaining time may be recalculated using the above equation. The time may be tracked by hardware, such as the assist unit counter 152, or by software in conjunction with the hardware.

While the remaining time units for the active assist request 142 may be calculated using the above approach, the remaining time units may also be calculated in other ways, as would become apparent to a person having ordinary skill in the art after reading the present disclosure. For example, in some embodiments, the assist unit 116 could track the remaining time directly by initializing the assist unit counter 152 with the total time units to complete the active request and then decrementing the calculated time units by the TUPS value of 6 as each step is completed. In other embodiments, the assist unit counter 152 may only keep track of the number of steps by initializing the assist unit counter 152 with total function size (i.e., steps) and then decrementing by 1 each time a step is completed. Management software 136 or software imbedded in the microprocessor 100 may then calculate the remaining time units for the active request 142 by multiplying the number of steps remaining by the TUPS value. Yet, in other embodiments, software may track the issue time (also referred to as start time) of the active request 142 and then subtract elapsed time from the total time needed to complete the active request 142.

Having determined the remaining time units for the active request 142 and the pending request 144, the management software 136 in conjunction with the assist unit counter 152 may determine the time units for the assist unit 116 to complete the current request 146 (i.e., the outstanding processing request 118) in isolation (e.g., as if the assist unit 116 could immediately start processing the current request 146), as well as the time units for the conventional means to complete the current request 146. Similar to the calculations described above, in order to calculate the respective time units for the assist unit 116 and the conventional means, the TUPS value for the assist unit 116 for the current request 146 may be multiplied by the function size 140 of the current request 146 the and the TUPS value for the conventional means for the current request 146 may be multiplied by the function size 140 of the current request 146. For example, assume that the current request 146 is a Lower_case_function having a function size 140 of 8000. Also, assume that the TUPS value for the conventional means is 60 and the TUPS value for the assist unit 116 is 10 (i.e., the assist unit 116 is capable of accelerating the Lower_case_function by 6× (60/10)). The time units for the assist unit 116 are calculated by multiplying the function size 140 of 8000 by the TUPS value of 10 which equals 80000 time units to complete the current request 146 in isolation (i.e., with no wait time) with the assist unit 116. The time units for the conventional means is calculated by multiplying the function size 140 of 8000 by the TUPS value of 60 which equals 480000 time units to complete the current request 146 with the conventional means.

Knowing the time units for the assist unit 116, including:
(1) the time units for the assist unit 116 to complete the pending requests 144;
(2) the remaining time units for the assist unit 116 to complete the active request 142; and
(3) the time units for the assist unit 116 to complete the current request 146 in isolation—the management software 136 can sum the total times units to complete the current request 146 with the assist unit 116. The management software may then compare the summed total for the assist unit 116 to the time units for the conventional means to complete the current request 146 in order to optimally select the assist unit 116 to complete the current request 146 or allow the conventional means to complete the current request 146.

Continuing with the above examples, the total time units to complete the current request 146 with the assist unit equals the pending request 144 total time units of 353566 plus the remaining time units for the active request 142 of 18000 plus the time units to complete current request 146 with the assist unit 16 of 80000 which equals 451566. Comparing the total time units of 451566 to conventional time units of 480000, the management system 136 selects the assist unit 116 to complete the current request 146 the fastest and accordingly queues current request 146 in queue 134. If the total time units for the assist unit 116 were greater than the conventional means time units, then the management software 136 would have sent the current request 146 back to hardware thread 114 for conventional processing. In determining whether to select the assist unit 116 for completion of the current processing request 146, the management software 136 may implement the following code, for example:

```
// Arrived at a point where an assist unit may be used
if (this_system_has_an_assist_unit_for_this_function) {
  // New system—has an assist unit
  Calculate Time_units_assist_unit;
  Calculate Time_units_conventional_means;
  if (Time_units_assist_unit<Time_units_conventional_means)
  {
    execute_code_that_leverages_assist_unit;
  }
  else {
    // New system but not worth using assist unit now
    execute_code that_performs_the_function_conventionally;
  }
}
else {
  // Old system—has no assist unit
  execute_code_that_performs_the_function_conventionally;
}
```

Figure 3A:
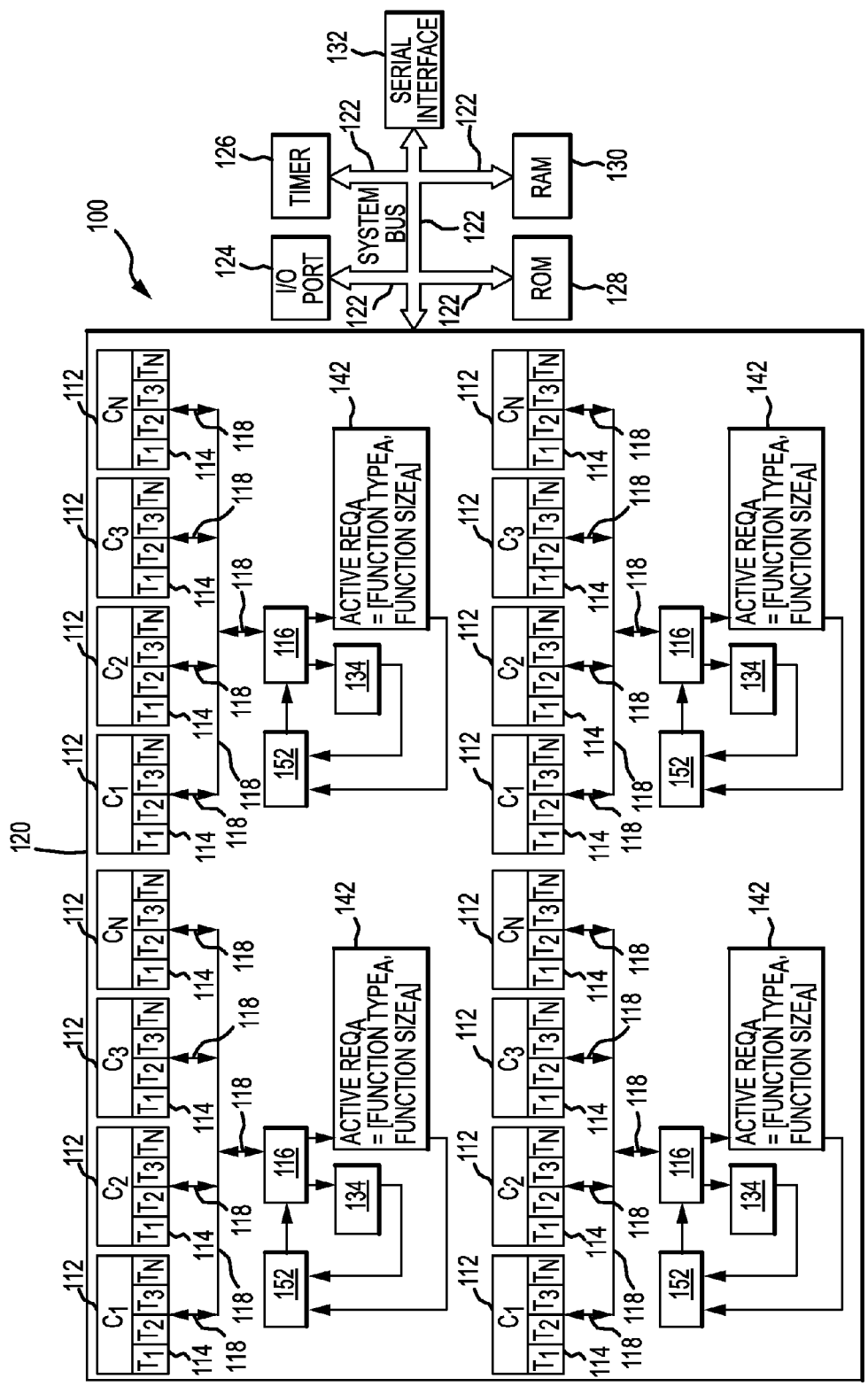
FIG. 3a is a block diagram illustrating various assist units and processing cores without management software.
Figure 3B:
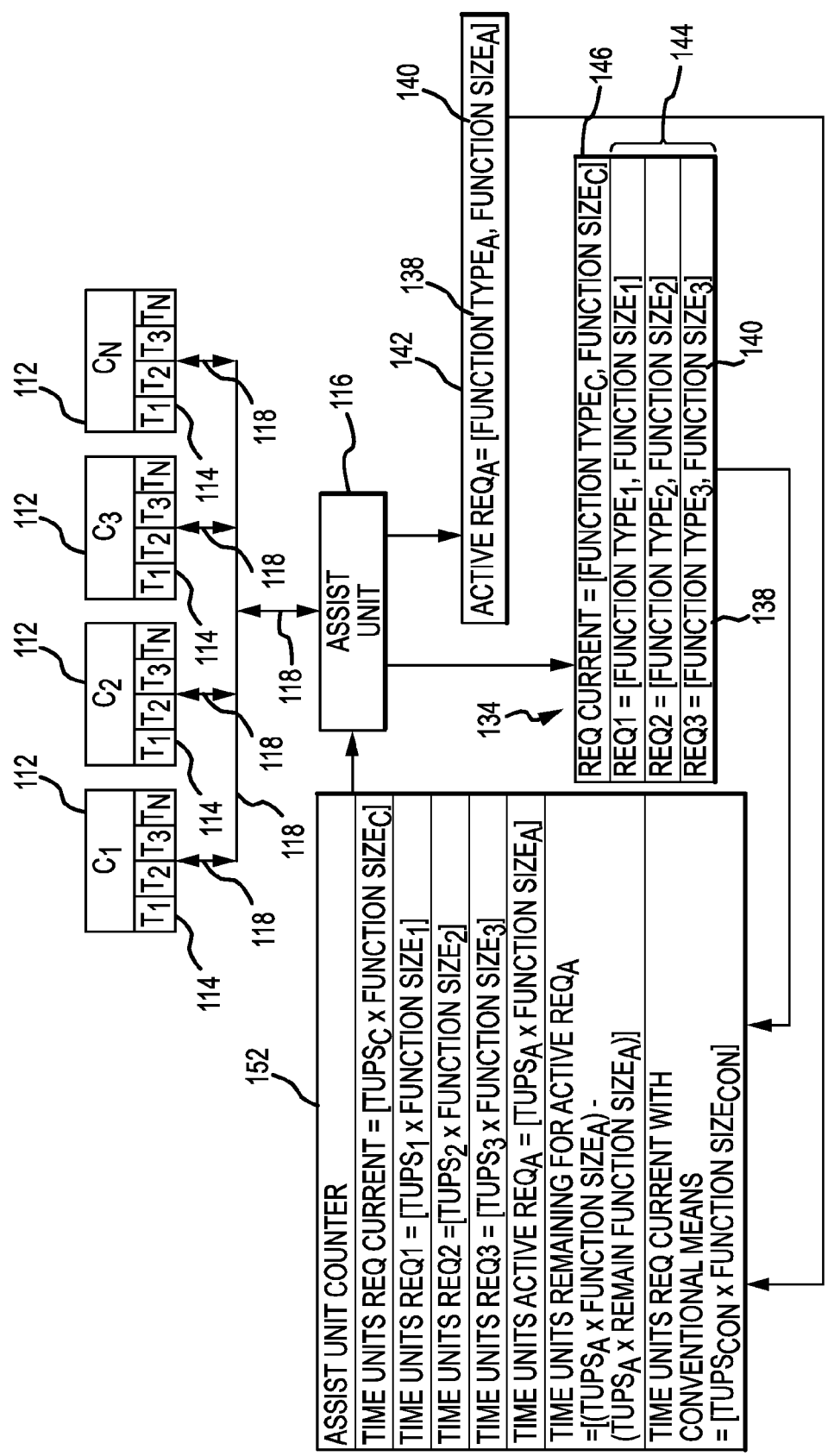
FIG. 3b is a block diagram illustrating an assist unit and processing cores without management software.

Turning now to FIGS. 3*a* and 3*b*, a block diagram having various assist units 116 and processing cores 112 without management software 136 is illustrated. In such an embodiment, a processing request 118 may be received by the CPU 120 through system bus 122. The CPU 120 may then assign the processing request 118 to a processing core 112 which then assigns the processing request 118 to a hardware thread 114. The hardware thread 114 may then check to see if an assist unit 116 is present and capable of completing the processing request 118. Alternatively, the processing core 112 may check to see if an assist unit 116 is present and capable of completing the processing request 118 before sending the processing request 118 to hardware thread 114. If an assist unit 116 is present and capable of completing the processing request 118, the assist unit 116 begins to analyze whether it can complete the processing request 118 faster than the hardware thread 114. When the assist unit 116 completion time is less than the hardware thread 114 completion time then the assist unit 116 queues the processing request 118 in queue 134 for completion. When the conventional completion time is less than the assist unit 116 completion time then the assist unit 116 returns the processing request 118 to the hardware thread 114 for completion.

As shown in FIG. 3*b*, in order to determine whether the assist unit 116 completion time is faster than the conventional completion time, the assist unit 116 in combination with hardware and/or software analyzes various features and determines the utilization of assist unit 116. As shown in FIG. 3*b*, and similar to those described above, such features may include a queue 134 of pending processing requests 144 having a function type 138 and function size 140 that are pending to be completed by the assist unit 116. The features also include a TUPS value (or polynomial coefficients) for each processing requests 118 including current processing request 146 and active processing request 142. The TUPS values may also include a conventional TUPS value related to the completion time for the hardware thread 114 to complete the current processing request 146 using conventional software. The features may also include assist unit counter 152 for determining time units with TUPS values. The assist unit counter 152 tracks time related to the current processing request 146, pending processing requests 144, and the active processing request 142.

Using such features and components the assist unit 116 determines the time units, including the time units for the pending request 144, the remaining time units for the active request 142, the time units for the assist unit 116 to complete the current request 146 in isolation, and the time units for the conventional means to complete the current request 146. The assist unit 116 in combination with software may then sum the total times units to complete the current request 146 and then compare the summed total to the time units for the conventional means and thereby optimally select the assist unit 116 to complete the current request 146 or allow the conventional means to complete the current request 146.

Figure 4:
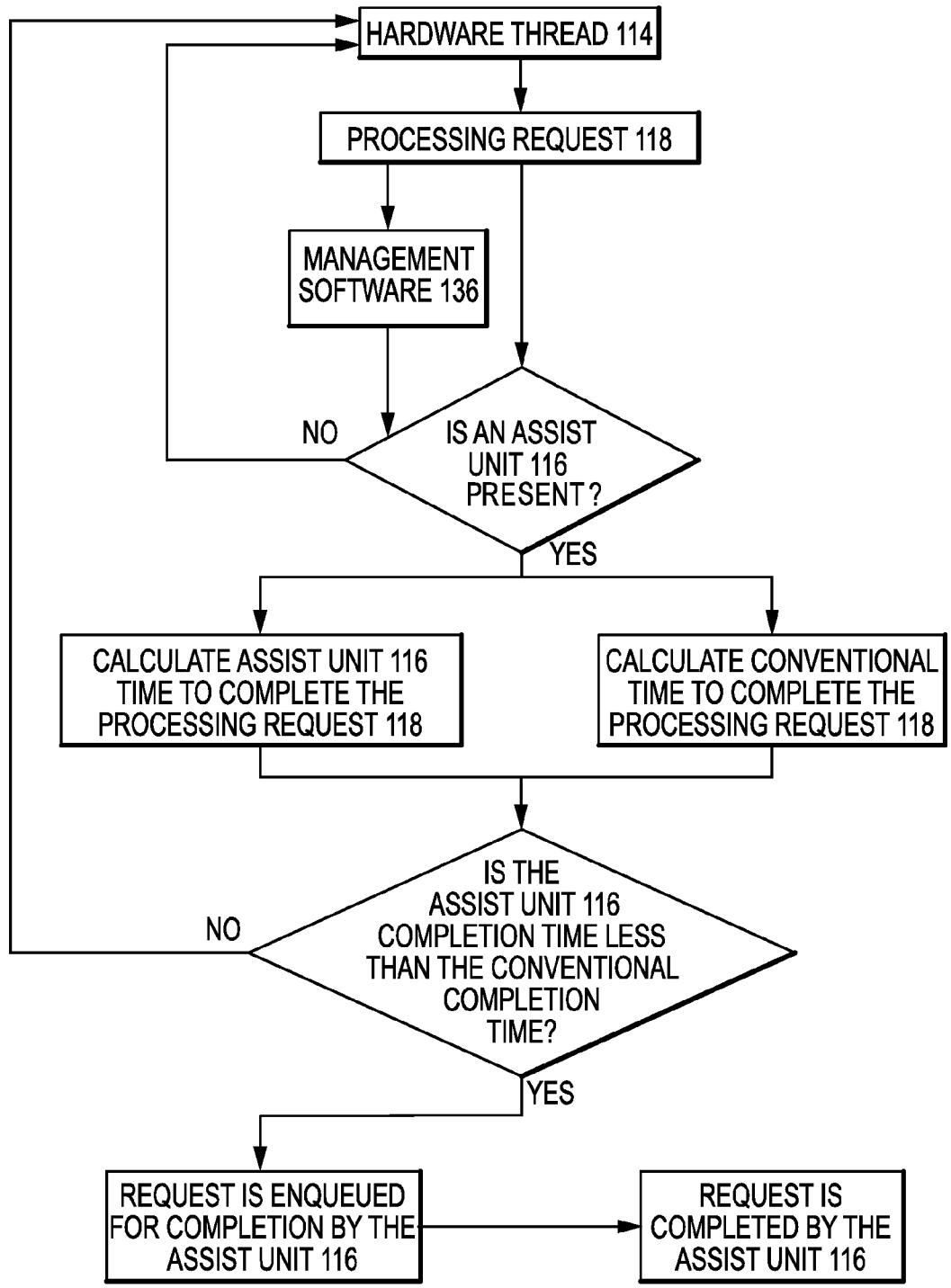
FIG. 4 is a flow diagram illustrating steps that may be performed to assign an assist unit to complete a processing request.

FIG. 4 shows one possible flow diagram illustrating steps that may be performed to assign an assist unit 116 to complete a processing request 118 using management software 136 or using the assist unit 116 without the management software 136. As shown, hardware thread 114 sends a processing request 118 to the management software 136 to determine if an assist unit 116 is present. The hardware thread 114 may determine if an assist unit 116 is present by using hardware and software imbedded on the CPU 120. If the assist unit 116 is not present, the processing request 118 is returned to the hardware thread 114 to be completed conventionally. If an assist unit 116 is present, the completion time for the assist unit 116 and conventional means is calculated using TUPS values. If the assist unit 116 completion time is faster than the conventional means then the processing request 118 is enqueued or completed by the assist unit 116. When the conventional means completion time is faster than the assist unit 116 completion time then the processing request 118 is returned to the hardware thread 114 to be completed conventionally. Accordingly, the disclosed methods, apparatuses, and systems may be used to extend the completion of processing request 118 to more than two choices, and work with different tables of TUPS values for different implementations.

Figure 5:
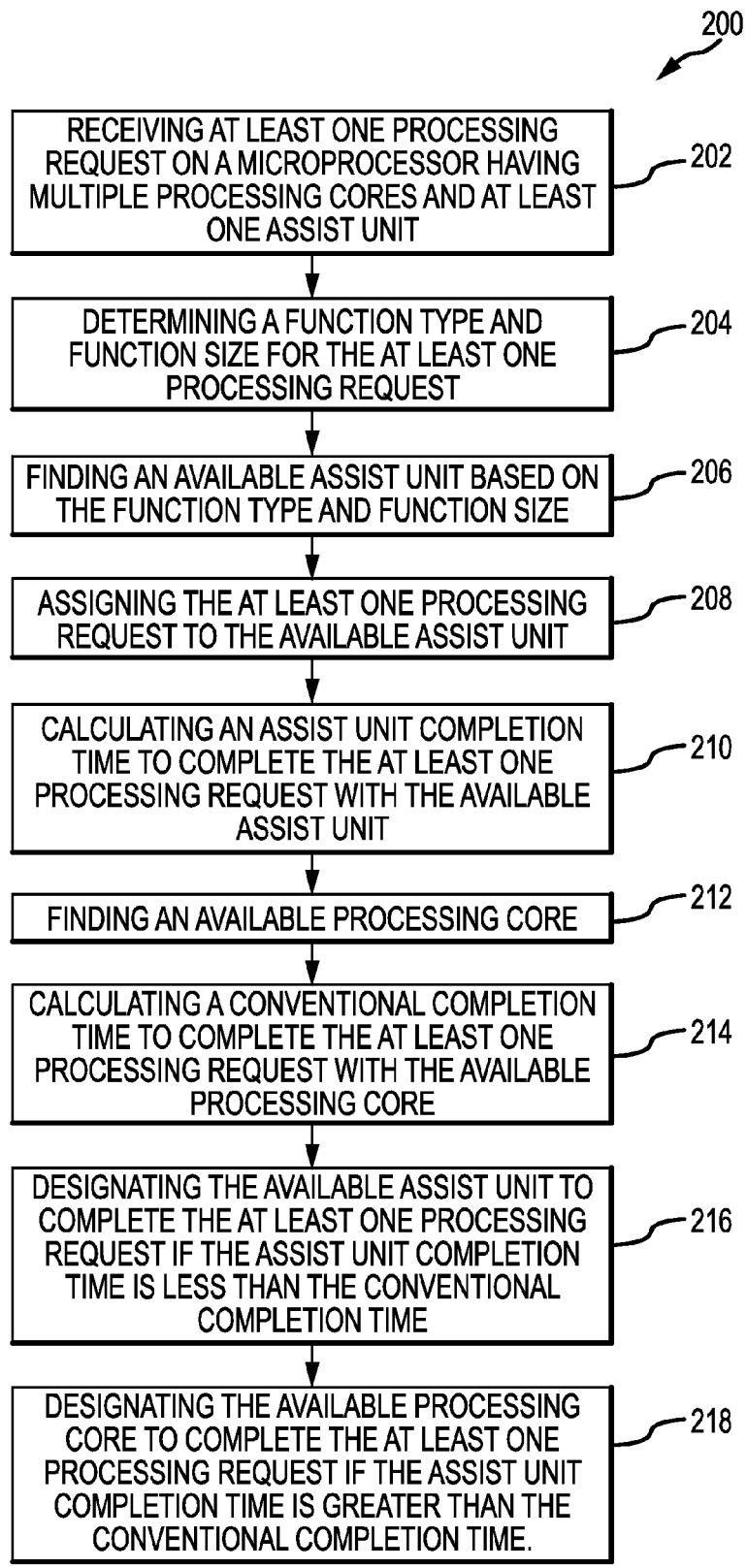
FIG. 5 is flow diagram illustrating a method that may be performed for optimally selecting an assist unit to complete a processing request.

Turning now to FIG. 5 showing a flow diagram illustrating method 200 that may be performed for optimally selecting an assist unit to complete a processing request. In one aspect, method 200 may include receiving 202 at least one processing request on a microprocessor having multiple processing cores and at least one assist unit, and determining 204 a function type and function size for the at least one processing request. Method 200 further includes finding 206 an available assist unit based on the function type and function size, and assigning 208 the at least one processing request to the available assist unit. Method 200 includes calculating 210 an assist unit completion time to complete the at least one processing request with the available assist unit. In some embodiments, method 200 also includes finding 212 an available processing core; calculating 214 a conventional completion time to complete the at least one processing request with the available processing core; designating 216 the available assist unit to complete the at least one processing request if the assist unit completion time is less than the conventional completion time; and designating 218 the available processing core to complete the at least one processing request if the assist unit completion time is greater than the conventional completion time.

It will be readily appreciated that many deviations may be made from the specific embodiments disclosed in the specification without departing from the spirit and scope of the invention. It is to be understood that not all components, modules, and the like of the microprocessor 100 have been shown in the figures in the interest of clarity. Furthermore, the process flow diagrams of FIGS. 4 and 5 have merely been provided as examples of process flows for optimally selecting an assist unit 116. Still further, while only four assist units 116 have been shown in FIGS. 2a and 3b, it is to be understood that the present teachings apply to other arrangements of any number of assist units 116 and processing cores 112. In addition, embodiments disclosed herein can be implemented as one or more computer program products, i.e., one or more modules of computer program instructions encoded on a computer-readable medium for execution by, or to control the operation of, data processing apparatus (processors, cores, etc.). The computer-readable medium can be a machine-readable storage device, a machine-readable storage substrate, a memory device, a composition of matter affecting a machine-readable propagated signal, or a combination of one or more of them. In addition to hardware, code that creates an execution environment for the computer program in question may be provided, e.g., code that constitutes processor firmware, a protocol stack, a database management system, an operating system, or a combination of one or more of them.

A computer program (also known as a program, software, software application, script, or code) used to provide the functionality related to microprocessor 100 and described herein can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described. Furthermore, the flow diagrams disclosed herein have merely been presented as examples of manners in which the present teachings can be implemented and do not in all cases necessarily require all the disclosed steps and/or the particular order in which the steps have been presented.

In different embodiments, distributed computing environment may include one or more of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A method for optimally selecting an assist unit to reduce completion times for completing requests to execute functions, comprising:
   receiving, with a microprocessor, at least one processing request to execute a function with at least one assist unit operatively associated with the microprocessor;
   determining, in response to the receiving, an assist unit completion time for completing the at least one processing request with the at least one assist unit;
   determining a hardware thread completion time for completing the at least one processing request with at least one hardware thread operatively associated with the microprocessor;
   completing the at least one processing request with the at least one assist unit when the assist unit completion time is less than the hardware thread completion time;
   completing the at least one processing request with another available assist unit when another available assist unit completion time for completing the at least one processing request with the another available assist unit is less than the assist unit completion time; and
   completing the at least one processing request with the at least one hardware thread when the hardware thread completion time is less than the assist unit completion time.

2. The method of claim 1, wherein the step of determining the assist unit completion time for completing the at least one processing request comprises analyzing a utilization of the at least one assist unit.

3. The method of claim 2, wherein analyzing the utilization of the at least one assist unit includes:
   determining a queued assist unit completion time for completing one or more pending requests in a queue of requests with the at least one assist unit;
   determining a current assist unit completion time for completing the at least one processing request with the at least one assist unit; and
   summing the queued assist unit completion time and the current assist unit completion time to obtain a total assist unit completion time.

4. The method of claim 3, wherein analyzing the utilization of the at least one assist unit further includes determining a remaining completion time for an active request being processed with the at least one assist unit.

5. The method of claim 3, further comprising removing completed requests from the queue.

6. The method of claim 1, wherein determining the assist unit completion time for the at least one processing request comprises maintaining a counter that tracks time units for completing one or more pending requests in a queue of requests with the at least one assist unit.

7. The method of claim 1, wherein determining the completion time for completing the at least one processing request with the at least one hardware thread comprises tracking a utilization of the at least one hardware thread.

8. The method of claim 1, wherein determining the assist unit completion time for the at least one processing request comprises recognizing a function type and function size for the at least one processing request and associating time units to the at least one processing request based on the function type and the function size.

9. A method for optimally selecting an assist unit to reduce completion times for processing requests to execute functions, comprising:
   receiving at least one processing request on a microprocessor having multiple processing cores and at least one assist unit;
   determining a function type and function size for the at least one processing request;
   finding an available assist unit based on the function type and function size;
   calculating an assist unit completion time to complete the at least one processing request with the available assist unit;
   finding an available processing core;
   calculating a completion time to complete the at least one processing request with the available processing core;
   designating the available assist unit to complete the at least one processing request when the assist unit completion time is less than the conventional completion time; and
   designating the available processing core to complete the at least one processing request when the assist unit completion time is greater than the completion time for completing the at least one processing request with the available processing core.

10. The method of claim 9, wherein calculating the assist unit completion time to complete the at least one processing request with the available assist unit comprises determining a time unit using a linear equation based on the function type and the function size of the at least one processing request.

11. The method of claim 9, wherein calculating the assist unit completion time to complete the at least one processing request with the available assist unit comprises determining a time unit using a polynomial equation based on the function type and the function size of the at least one processing request.

12. The method of claim 9, wherein determining the function type and the function size for the at least one processing request comprises estimating the function type and the function size.

13. A system for optimally selecting an assist unit to reduce completion times for processing requests to execute functions, comprising:
   management software, encoded on a non-transitory computer-readable medium, in communication with a plurality of processing cores and at least one assist unit, wherein the management software manages processing requests and wherein the management software is configured to:
   determine a function type and function size for an outstanding processing request;
   locate at least one available assist unit to complete the outstanding processing request; wherein the management software locates the at least one available assist unit by selecting the available assist unit based on the function type and function size for the outstanding processing request;
   calculate an assist unit completion time for the outstanding processing request;
   calculate a completion time for completing the outstanding processing request without the assist unit;
   compare the completion time for completing the outstanding processing request without the assist unit to the assist unit completion time for the outstanding processing request;
   assign the outstanding processing request to the available assist unit when the assist unit completion time is less than the completion time for completing the outstanding processing request without the assist unit; and
   assign the outstanding processing request to an available processing core when the assist unit completion time is greater than the completion time for completing the outstanding processing request without the assist unit.

14. The system of claim 13, wherein the management software compiles a list of at least one pending processing request that has not been completed and a list of at least one active processing request that is actively being processed by the available assist unit.

15. The system of claim 14, wherein determining the assist completion time for the at least one pending processing request comprises calculating a total assist unit completion time, wherein the total assist unit completion time comprises:
   a remaining assist unit completion time for completing the at least one active request by the available assist unit, and
   a pending assist unit completion time for completing the at least one pending processing request by the available assist unit.

16. The system of claim 13, wherein the processing requests have function types and function sizes and the management software calculates the assist unit completion time and the completion time for completing the outstanding processing request without the assist unit based on the function types and the function sizes.

17. The system of claim 13, wherein the management software is compatible with existing software used by the plurality of processing cores.

18. The system of claim 13, wherein the management software comprises a counter that tracks the assist unit completion time and the completion time for completing the outstanding processing request without the assist unit.

* * * * *

UNITED STATES PATENT AND TRADEMARK OFFICE
CERTIFICATE OF CORRECTION

PATENT NO.        : 9,465,618 B2
APPLICATION NO.   : 14/150471
DATED             : October 11, 2016
INVENTOR(S)       : Kalogeropulos et al.

It is certified that error appears in the above-identified patent and that said Letters Patent is hereby corrected as shown below:

In the Specification

In Column 8, Line 67, delete "the and the" and insert -- and the --, therefor.

Signed and Sealed this
Thirteenth Day of June, 2017

Joseph Matal
*Performing the Functions and Duties of the
Under Secretary of Commerce for Intellectual Property and
Director of the United States Patent and Trademark Office*